United States Patent Office 3,300,390
Patented Jan. 24, 1967

3,300,390
PROCESS FOR HARVEST OF SPORES FROM
AERIAL MICROBIAL STRUCTURES
Jack D. Tiner, Washington, D.C., and Allen Golden,
Long Beach, Calif., assignors to Melpar, Inc., Falls
Church, Va., a corporation of Delaware
No Drawing. Filed Mar. 23, 1964, Ser. No. 354,096
4 Claims. (Cl. 195—104)

This invention relates to a novel method for the production and harvest of microbial (mold and actinomycete) spores. More particularly, the invention concerns a method whereby fungi or molds are grown on suitable substrates, until sporulation has occurred, followed by submergence in a liquid medium and separation of the spores by means of ultrasonic vibrations.

The increasing possibilities for application of mold spores in crop control and pesticides, and their current widespread use in industrial fermentations and in allergenic research, has made it of importance to find a method for the efficient cultivation and harvest of such spores. Methods heretofore available have been inefficient and undependable, and the spores they have provided have been obtained in low yields, contaminated by substrate and by mold hyphae and mycelia. Methods of mold cultivation presently in use involve growth of the mold on a cereal medium, such as bran flakes, and the like, open air incubation, and harvest in a stream of air. The hyphae, or branched threads, of the mold or fungus, make up the plant body of the mold, known as the mycelium. Within the mycelium, the spores by means of which the mold reproduces, are produced in large numbers.

Methods which have been previously employed for the separation or harvest of the spores from the mycelium include filtration, agitation of the spore suspension with a high speed stirrer which exerts a shearing action, and the action of an air stream. These methods have proved ineffective in that they result largely in low yields of frequently contaminated spores.

In accordance with the invention, there is provided a novel method for the production and harvest of mold spores which avoids the shortcomings of prior art procedures, and which produces high yields of almost 100% pure spores efficiently and economically.

The novel method of the invention comprises the steps of growing a mold or fungus on a solid air-exposed nutrient substrate until sporulation has occurred to the desired extent, submerging the intermingled mycelium and spores in a liquid medium, removing entrapped gases from the submerged material, then subjecting the liquid medium and contained submerged material to the action of ultrasonic vibrations to liberate the spores from the mycelium, and finally separating and removing the desporulated mycelium from the spores.

The use of high frequency vibrations has been proposed in the prior art to kill molds or bacteria, and to deflocculate small colonies of bacteria to form suspensions in liquid media so as to bring them into closer contact with nutrients. However, ultrasonic vibrations have not been employed for separation or harvest of spores from mold mycelia prior to the present invention.

It was found, in accordance with the invention, that the harvest or separation of the spores cannot be accomplished efficiently if the mycelium is filled with entrapped air. Accordingly, the removal of entrapped air from the submerged mycelium is an essential step in the conduct of the method of the invention. Removal of the entrapped air promotes direct coupling between the mycelium and the liquid medium, whereby the ultrasonic vibrations applied to the medium can be effectively transmitted through the medium to the submerged mycelium. The presence of entrapped air prevents such coupling.

The preferred method for the removal of entrapped air is the application of one or more vacuum treatments to secure wetting of the mycelium by the liquid medium. The preferred liquid medium is water, but any other mobile liquid which is inert to the mold and spores and which will wet the mycelium may be employed.

The removal of entrapped air from the mycelium may also be carried out by other suitable means besides vacuum degassing. Thus, there may be employed an increase of hydrostatic pressure, possibly to the extent of a few atmospheres, a nonaqueous liquid medium which is capable of wetting the mycelium while displacing air bubbles, and the incorporation in the aqueous medium of a suitable surfactant.

It is an advantage of the method of the invention that it not only permits the separation of a virtually 100% pure spore product, but that it also facilitates the harvesting of more than one crop of spores from the same mold mycelium. This makes possible the production of large quantities of mold spores while adhering to pure culture procedures, and at the same time maintaining a stock culture from which inoculum can be reliably obtained when needed.

The method of the present invention provides a harvest procedure which may be employed in conjunction with any known culture method. Known methods for the production of mold spores include both submerged spore culture and growth of an air-exposed substrate. The ultrasonic irradiation of the invention may be applied to the products of both of these culture methods. The preferred method, and the one which will be employed herein to illustrate the practice of the invention, is the growth of the mold on the surface of a solid, air-exposed substrate, such as an agar plate. It is to be understood, however, that the scope of the invention is not to be considered as limited thereby. Where the air-exposure culture procedure is used to establish sporulation, the additional steps of submergence and degassing of the mycelium are indicated.

The preferred general culture procedure in accordance with the invention is to employ as a culture medium either an agar block or plate, constituting a solid, air-exposed substrate, on both sides of which the mold can be grown. The plate may be surrounded by a rigid supporting frame, or else the mold can be grown on the surfaces of an agar-impregnated cloth stretched over a supporting frame. The culture is carried out in a protected environment, such as a sterile enclosure, to protect the mold from all biological contaminants. After spores have formed to the desired extent, the substrate and the mycelial growth and spores are immersed in water.

A vacuum is then applied, and adherent, nontransmissive air pockets and bubbles in the mycelium are removed by one or more vacuum treatments applied successively, with intermediate release of the vacuum, the operation being performed in a suitably constructed tank, which can also serve for the subsequent application of ultrasonic vibrations.

While the method of the invention is applicable to the growth and harvest of all classes of molds, fungi and actinomycetes and their spores, it will be illustrated with regard to two well-known organisms, *Aspergillus niger*, and *Penicillium citrinum*. It is to be understood, however, that these organisms are for purposes of illustration only, and are not to be regarded as limiting the scope of the invention.

The culturing of the selected molds is carried out in accordance with conventional methods employing conventional culture media for these organisms, such as potato dextrose agar, or agar admixed with modified Czapek's broth of Difco mycological broth and agar. Cheese cloth squares were stretched on stainless steel wire frames. A broth culture of *Aspergillus niger* was drawn in and out of the chamber of a 10 ml. syringe via a 4 inch, 14 gauge cannula until a turbid suspension resulted among the remaining pieces of mycelium. Sterilized squares on wire frames were wetted in the suspension, propped up in a staining dish, covered, and allowed to dry. Mycological agar was plated 1 cm. thick in specimen storage dishes (Corning Glass Works, No. 3250), and then the cheese cloth squares were laid on the moist surface of the agar. After the resulting mold growth had started to form spores, it was lifted out into a sterile, empty specimen dish, covered, and allowed to complete sporulation and to dry. One side of the squares became covered with spores.

These squares were immersed in distilled water and degassed by vacuum treatment in a degassing tank. The degree of vacuum applied is variable, being generally of the order of about 1/10 atmospheres available from a water-driven aspirator.

Following degassing, the solid culture plates or squares are subjected to ultrasonic vibration treatment, in order to liberate the spores from the mycelium. The effect of the ultrasonic treatment may be visually observed in that the color of the mycelium covered with millions of spores changes from black to light grey. A dark cloud of spores may be seen dispersing into the water when an agar block is gently moved with a probe during the ultrasonic treatment. Microscopic examination of the water reveals that the suspension consists of pure spores. Most of the spores are single, although aggregates of two to five, or even eight were also present. The effect of the ultrasonic treatment upon spore viability is negligible.

The ultrasonic vibrations may be applied to the liquid medium containing the mycelium and spores from any suitable source. Thus, there may be employed either ultrasonic tranducers of conventional design, or piezo electric crystal type ultrasonic impulse generators of well known type. The intensity of the energy is not critical, and may advantageously range from about 1 to 5 watts per sq. cm. at 80 kilocycles. The time of application may range from repeated pulses of brief duration to prolonged exposure of 1 to 30 minutes.

The efficiency of the ultrasonic treatment of the invention is shown by the fact that more than 80% of the formed spores are released within the first 10 minutes of the treatment. The spores of *Penicillium citrinum* are, however, released somewhat more slowly than those of *Aspergillus niger*.

After the ultrasonic treatment has been completed, the suspension of spores in the tank is drained, and then centrifuged to harvest and collect the spore product. Depending upon its subsequent use, the crop of spores may be harvested in refrigerated water and employed as a spray, or it may be freeze-dried. Any small amount of unwanted debris or dissolved nutrients or chemicals may be removed by appropriate rinses and filtration of the spores. A dried spore powder may be prepared subsequent to removal of the water and dehydration of the product.

The separated mycelium can, if desired, be re-treated with nutrient and used to produce another crop of spores, or else, it can be discarded.

The following examples serve to illustrate the practice of the invention, but are not to be regarded as limiting:

*Example 1.—Effect of ultrasonic vibrations on spore count*

A block of agar with *Aspergillus niger* mycelium on its surface was cut from a Petri dish culture. It was immersed in 200 ml. of water, degassed under vacuo, and treated at 80 kc., 3.2 watts/sq. cm. intensity with ultrasonic vibrations from a transducer, for a total of 31 minutes. At intervals of 1, 6, 11 and 31 minutes, the suspension was stirred and 1 ml. samples were removed. These were diluted 1:100 and counted in a standard haemocytometer slide, in the same manner as for white blood cells. The number of spores observed per 0.5 cu. mm. were as follows:

| Time in Minutes | 1 | 6 | 11 | 31 |
|---|---|---|---|---|
| Total No. Spores (12 Counts) | 94 | 164 | 157 | 136 |
| Mean No. Spores | 7.8 | 13.7 | 13.3 | 11.3 |
| No. Spores/cm.$^3$ | 15,600 | 27,420 | 26,200 | 22,600 |

Calculation method:

$$\text{Mean No. Spores}/5 \text{ mm.}^2 \times .1 \text{ mm.} \times 1000 \text{ mm.}^3/\text{cm.}^3 = \text{No. Spores/cm.}^3$$

It appears that there was no appreciable destruction of mold spores during the 31 minute period of treatment. The purity of the spores was found to be close to 100% when they were observed with the aid of a compound microscope.

*Example 2.—Yield of spores from mycelium by ultrasonic treatment*

A block of agar with *Aspergillus niger* mycelium on its surface was prepared as in Example 1, and treated with the same intensity of ultrasonic vibrations as above for 1 minute and 15 seconds. The block with its adhering mycelium was then lifted out of the mold spore suspension and placed in 200 ml. of water. The block was broken up by a 30 second treatment in a Waring Blendor. Counts were made as in Example 1. The results were:

NUMBERS OF SPORES OBSERVED PER .5 MM.$^3$

| Suspension | From Ultrasonic Bath | From Waring Blendor |
|---|---|---|
| Totals | 99 | 21 |
| Mean No. spores | 8.25 | 1.75 |
| No. spores/cm.$^3$ | 16,500 | 3,500 |
| Total No., Bath and blendor | | 20,000 |

The percentage efficiency of recovery was therefore 16,500/20,000×100, or 82.5% harvested; 17.5% remained on agar.

*Example 3.—Effect of ultrasonic vibration on spore viability*

*Aspergillus niger* spores obtained as in Example 2 were diluted so as to produce a microscopic count of 200 per ml. One ml. of this diluted suspension was placed in 25 ml. of mycological agar. After 48 hours, the plates were counted. The results were as follows:

NUMBERS OF COLONIES COUNTED PER AGAR PLATE

| Time in Minutes | 1 | 6 | 11 | 31 |
|---|---|---|---|---|
| Microscopic count | 18,000 | 14,000 | 30,000 | 26,000 |
| Dilution factor 1 | 90 | 70 | 149 | 130 |
| Total count per plate | 135 | 153 | 105 | 129 |
| Mean No. colonies | 27 | 30.1 | 21 | 25.8 |
| Viable spores per ml | 2,430 | 2,107 | 3,129 | 3,354 |

Calculation: Mean No./plate×Dilution=Viable spores per ml.

It is concluded that there was no apparent effect of ultrasonic treatment on viability of spores.

*Example 4.—Spore yield from ultrasonically treated Penicillium citrinum*

A sporulated mycelium on a block of agar was taken from a *Penicillium citrinum* culture plate, submerged in 200 ml. of water and degassed under vacuum. It was treated with ultrasonic vibrations from a transducer as in Example 1, for 1, 5 and 10 minutes, and then removed to 200 ml. of clean water in a Waring Blendor for a 10 second disintegrative treatment. The results in terms of number of spores liberated were as follows:

NUMBERS OF SPORES PER .5 MM.³

| Time, min | From Ultrasonic Bath | | | From Waring Blendor |
|---|---|---|---|---|
| | 1 | 5 | 10 | |
| Total | 251 | 404 | 568 | 114 |
| Mean No. spores | 25.1 | 40.4 | 56.8 | 11.4 |
| No. spores/cm | 50,200 | 80,800 | 113,600 | 22,800 |

Percentage efficiency:

$$\frac{113,600}{113,600+22,800} \times 100 = 83.3\%$$

It is concluded that about 10 minutes were needed to liberate the spores of *P. citrinum,* as contrasted with about 6 minutes for spores of *A. niger* as in Example 1.

What is claimed is:

1. Method for the separation of spores from the mycelium of molds with which said spores are attached and intermingled which comprises the steps of submerging the mycelium and spores in water, removing entrapped gases from the submerged material by applying to the water and mycelium at least one vacuum treatment, subjecting the water and contained submerged material to the action of ultrasonic vibrations to liberate the spores from the mycelium, and separating the liberated spores from the desporulated mycelium.

2. The method of claim 1 in which the ultrasonic vibrations have an intensity of from about 1 to about 5 watts per sq. cm. at 80 kilocycles.

3. The method of claim 1 in which the time of treatment with ultrasonic vibrations is from about 1 to 30 minutes.

4. Method for the growth and harvest of mold spores which comprises the steps of cultivating a mold on a solid air-exposed nutrient substrate until sporulation has been substantially completed, submerging the substrate and the mold mycelium having spores attached and intermingled therewith in water, removing entrapped gases from the submerged material by applying to the water and mycelium at least one vacuum treatment, subjecting the water and contained submerged material to the action of ultrasonic vibrations to liberate the spores from the mycelium, and separating the liberated spores from the desporulated mycelium.

References Cited by the Examiner

FOREIGN PATENTS 761,278  11/1956  Great Britain.

A. LOUIS MONACELL, *Primary Examiner.*

L. M. SHAPIRO, *Assistant Examiner.*